Sept. 15, 1942.  J. H. HAMMOND. JR  2,296,032
NAVIGATIONAL POSITION INDICATOR
Filed Feb. 23, 1938  6 Sheets-Sheet 1

INVENTOR
JOHN HAYS HAMMOND JR.
BY
ATTORNEY

Sept. 15, 1942.   J. H. HAMMOND, JR   2,296,032
NAVIGATIONAL POSITION INDICATOR
Filed Feb. 23, 1938   6 Sheets-Sheet 4

INVENTOR
JOHN HAYS HAMMOND JR
BY *H. S. Grover*
ATTORNEY

Sept. 15, 1942.    J. H. HAMMOND, JR    2,296,032
NAVIGATIONAL POSITION INDICATOR
Filed Feb. 23, 1938    6 Sheets-Sheet 5

INVENTOR
JOHN HAYS HAMMOND JR.

Sept. 15, 1942.   J. H. HAMMOND, JR   2,296,032
NAVIGATIONAL POSITION INDICATOR
Filed Feb. 23, 1938   6 Sheets-Sheet 6
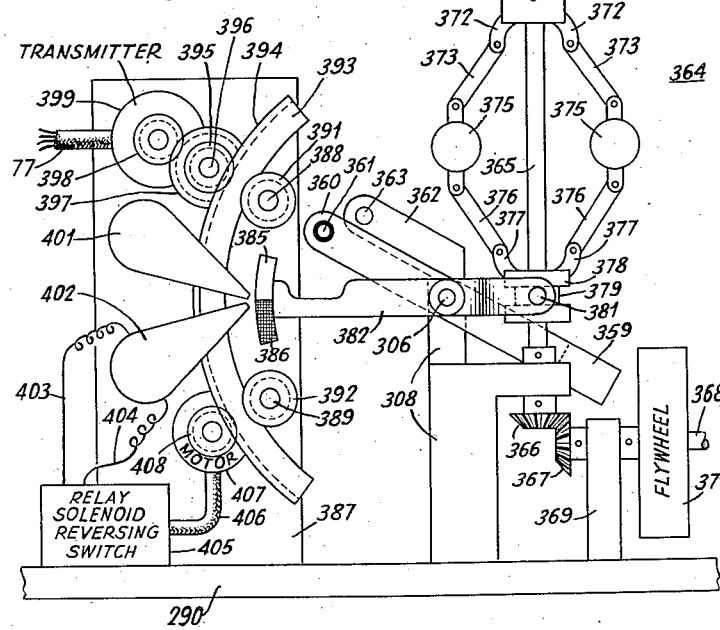
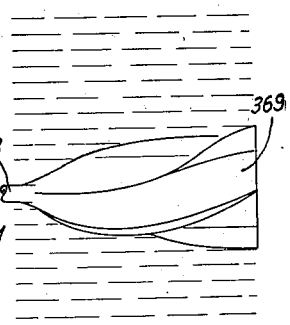
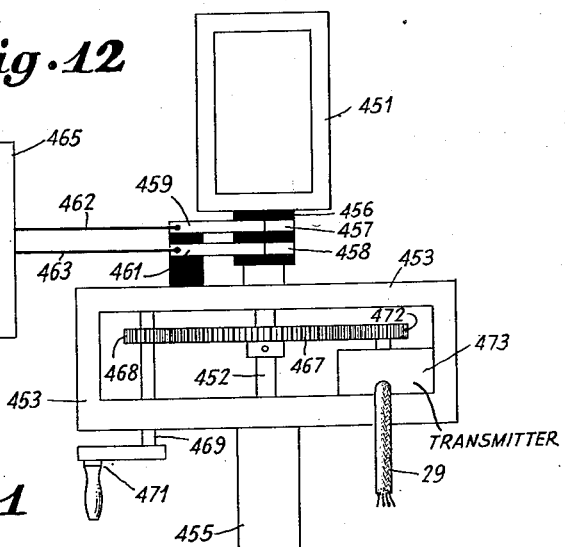
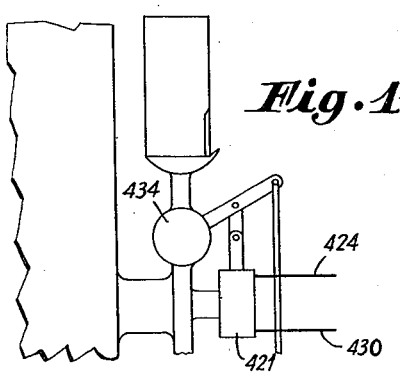
INVENTOR
JOHN HAYS HAMMOND JR.
BY
ATTORNEY Patented Sept. 15, 1942

2,296,032

UNITED STATES PATENT OFFICE 2,296,032

NAVIGATIONAL POSITION INDICATOR

John Hays Hammond, Jr., Gloucester, Mass., assignor to Radio Corporation of America, New York, N. Y., a corporation of Delaware Application February 23, 1938, Serial No. 191,898

5 Claims. (Cl. 177—352)

This invention relates to navigational position revealing systems and more particularly to a system for determining the position of one craft with respect to another.

The invention provides means for locating the position of a craft by the use of a direction finding system and an improved means for determining the direction of travel, speed and distance of said craft.

The purpose of this invention is to enable the navigator of a vessel approaching another vessel to ascertain the bearings of the other vessel with respect to his ship, the compass course the other vessel is following, the rate of travel of the other vessel and its distance from his ship.

The invention also provides means for automatically keeping an indicating means in synchronism with the card of a magnetic compass.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a top plan view of one embodiment of the invention;

Fig. 9 is a front elevation of part of the mechanism shown in Fig. 8;

Fig. 10 is a view of the submerged means for rotating the mechanism shown in Fig. 9;

Fig. 11 is a fragmentary elevation of the whistle of a vessel together with its operating mechanism, and Fig. 12 is an elevation of the direction determining means used in connection with Figs. 1–3.

Like reference characters denote like parts in the several figures of the drawings.

In the following description and in the claims parts will be identified by specific names for convenience, but they are intended to be as generic in their application to similar parts as the art will permit.

Figure 1:
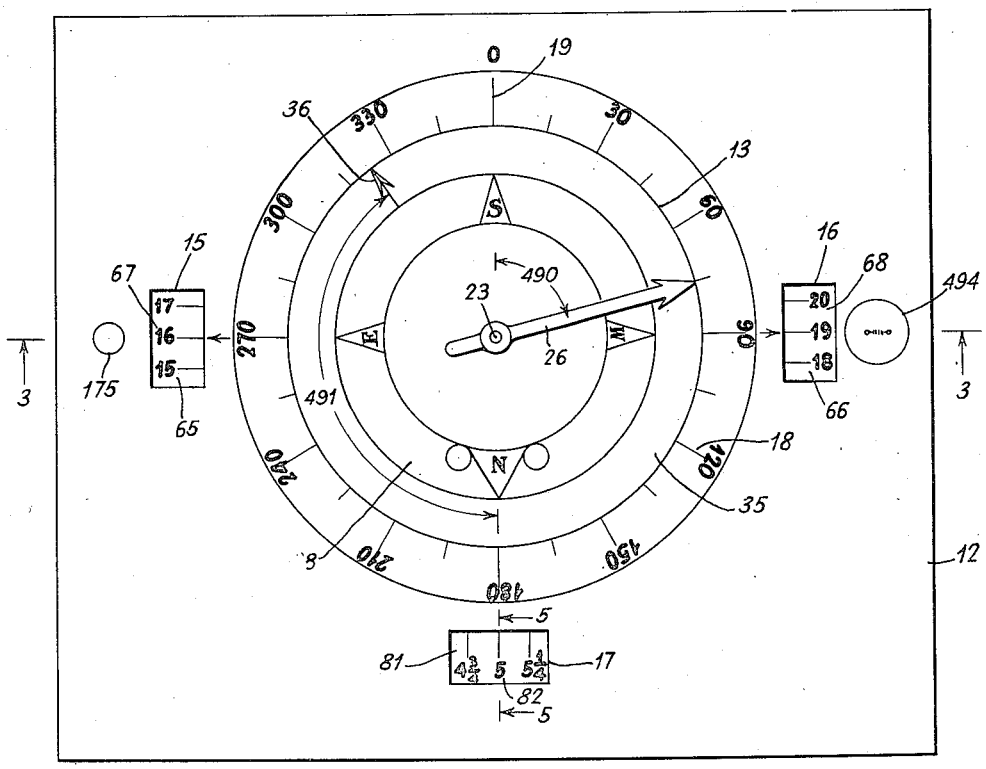
Figure 2:
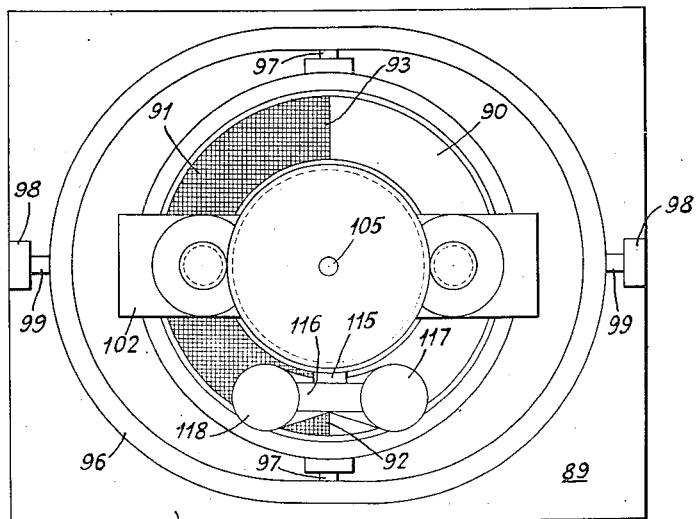
Fig. 2 is a top plan view of a magnetic compass equipped with a photo-electric angle transmitting system.
Figure 3:
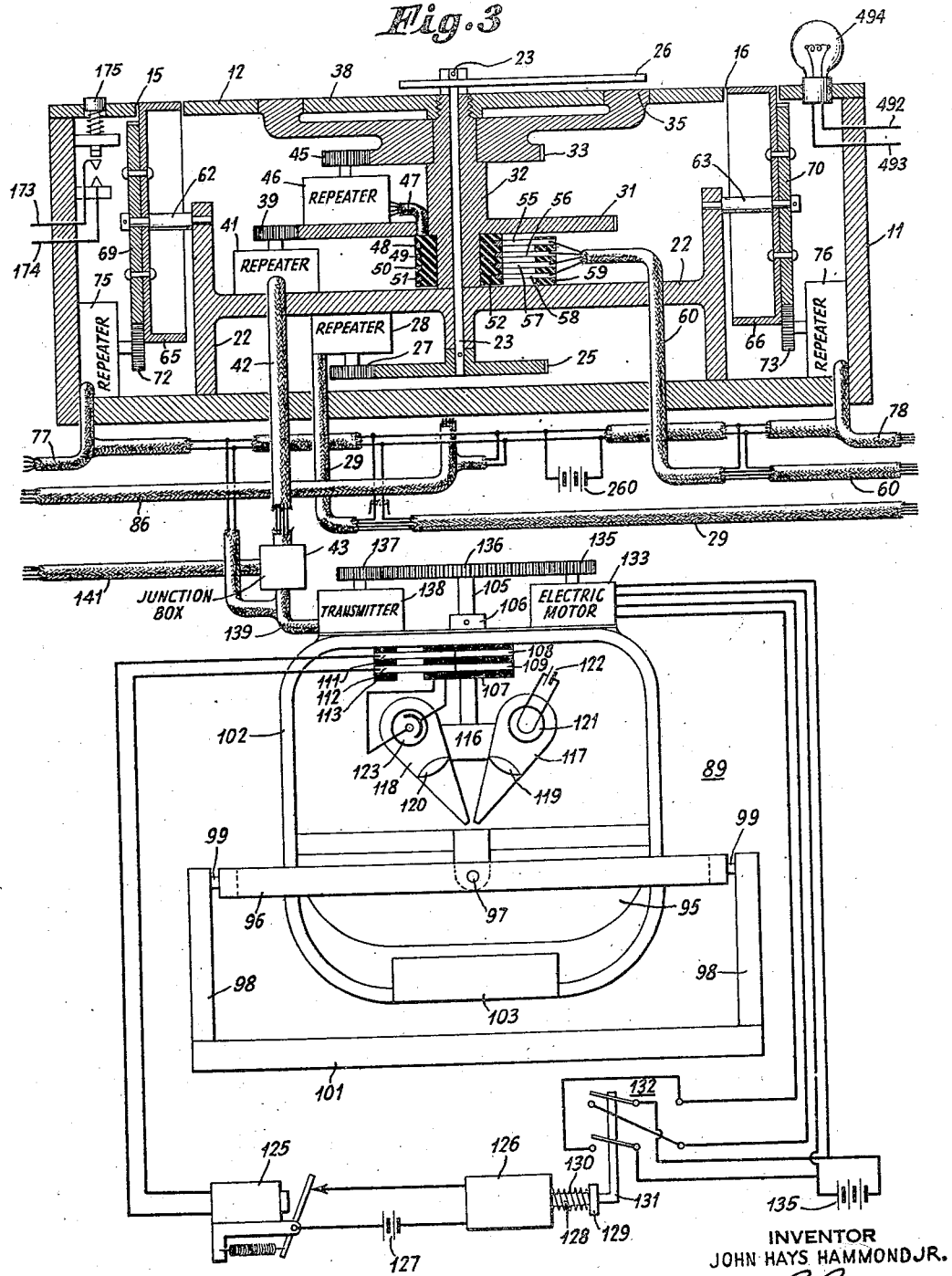
Fig. 3 is a sectional elevation taken on line 3—3 of Fig. 1 and a front elevation of Fig. 2, in functional relationship.

Referring to the accompanying drawings and more particularly to Figs. 1 to 3, one embodiment of the invention comprises a casing 11 to which is secured a cover plate 12. This plate is provided with a circular opening 13 and three rectangular openings 15, 16 and 17. A dial 18, on which is engraved the degrees of a circle, is located around the circular opening 13, the zero line 19 of which represents the so-called "lubber line" of the primary vessel, indicated at 21 in Fig. 7.

Mounted in the casing 11 is an H-shaped frame 22 (see Fig. 3). Rotatably mounted in the frame 22 is a shaft 23 to the lower end of which is secured a gear 25 and to the upper end a pointer 26. The gear 25 meshes with a pinion 27 secured to the end of the shaft of an electrical repeater 28, which is mounted on the frame 22. The repeater 28 is connected to one end of a four wire cable 29.

Rotatably mounted on the shaft 23 is a gear 31 provided with a hub 32. Rotatably mounted on the hub 32 is a second gear 33 to which is secured an annular ring 35, which fits in the circular hole 13 in the plate 12. The ring 35 has engraved thereon an arrow 36 which indicates the "lubber line" and therefore the heading of the secondary vessel 37 (see Fig. 7).

Secured to the upper end of the hub 32 is a dial 38 representing the compass card of the primary vessel 21. This dial 38 fits inside the annular ring 35. Meshing with the gear 31 is a pinion 39 secured to the end of the shaft of an electrical repeater 41 which is mounted on the frame 22. The repeater 41 is connected by a four wire cable 42 to a junction box 43.

Meshing with the gear 33 is a pinion 45 secured to the shaft of an electrical repeater 46 which is mounted on the gear 31. The repeater 46 is connected by a four wire cable 47 to four slip rings 48 to 51 of conducting material which are mounted on a commutator 52 of insulating material which is secured to the hub 32. Engaging the four slip rings 48 to 51 are four brushes 55 to 58 mounted on a block 59 of insulation which is secured to the frame 22. The four brushes 55 to 58 are connected to the four wires of a cable 60.

Secured to the frame 22 are two hubs 62 and 63 upon which are rotatably mounted two drums 65 and 66 respectively provided with numerals 67 and 68 representing the speeds of the primary vessel 21 and the secondary vessel 37 respectively. These drums are visible through the openings 15 and 16. Fastened to the drums 65 and 66 are two gears 69 and 70, which mesh with two pinions 72 and 73 secured to the shafts of two electrical repeaters 75 and 76, which are mounted in the casing 11. The repeaters 75 and 76 are connected to two four wire cables 77 and 78 respectively.

Secured to the frame 22 is a hub 80 (see Fig. 5) upon which is rotatably mounted a drum 81 provided with numerals 82 representing the distance of the secondary vessel 37 from the primary vessel 21. This drum is visible through the opening 17. Fastened to the drum 81 is a gear 83 which meshes with a pinion 84, secured to the shaft of an electrical repeater 85, which in turn is connected to a four wire cable 86.

Mounted in any suitable part of the ship is a magnetic compass 89, the dial of which is divided into two semicircular sectors; 90 of white material and 91 of black material. These two sectors meet at two lines 92 and 93, the former being the north point of the compass card and the latter being the south point. The bowl 95 of the compass 89 is suspended in the usual gimbal ring 96 which is pivoted to the compass bowl 95 at 97 and to two uprights 98 at 99. The uprights 98 are supported on a base plate 101.

A vertical frame 102 is secured to the compass bowl 95 and is provided at its lowest portion with a heavy weight 103 for counterbalancing the apparatus presently to be described. Rotatively mounted in the frame 102 is a shaft 105 which is provided with a collar 106 pinned thereto, which prevents it from sliding downward through the frame 102. Secured to the shaft 105 is a commutator 107 made of insulating material and provided with two slip rings of conducting material 108 and 109. Engaging these slip rings are two brushes 111 and 112 which are mounted upon a block of insulating material 113 which is secured to the frame 102.

Secured to the lower end of the shaft 105 is an arm 115 (Fig. 2) to the end of which is secured a cross member 116. Secured to this cross member are two cone shaped receptacles 117 and 118, the lower ends being open and forming somewhat elongated slots. Mounted in each of these receptacles are two lenses 119 and 120. At the upper ends of these receptacles are located a source of illumination 121 connected to a battery 122 and a photo-electric cell 123. The elements of this cell are connected to the slip rings 108 and 109 of the commutator 107.

The brushes 111 and 112 are connected to a sensitive relay 125 which is operated directly by the action of light on the photo-electric cell 123 which may be of the type which operates a relay without the use of any external source of power. If found desirable, however, a battery could be inserted in the circuit to improve the operation of the relay 125. The contacts of the relay 125 are included in a circuit comprising a solenoid 126 and a battery 127. The core 128 of the solenoid 126 is provided with a collar 129. Between this collar and the solenoid is a coil spring 130 tending normally to keep the core 128 extended. This core is in engagement with arm 131 of a double pole double throw reversing switch 132. This switch operates in a well known manner to reverse the rotation of a motor 133 which is supplied with energy from a battery 135.

Attached to the shaft of the motor 133 is a pinion 135 which engages with a gear wheel 136 secured to the end of the shaft 105. Meshing with the gear 136 is a pinion 137 which is secured to the shaft of an electrical transmitter 138. This transmitter is connected by a four wire cable 139 to the junction box 43. From this junction box extend two four wire cables, each of which is connected to the four wires in the cable 139, one being the four wire cable 42 and the other being a four wire cable 141.

Figure 4:
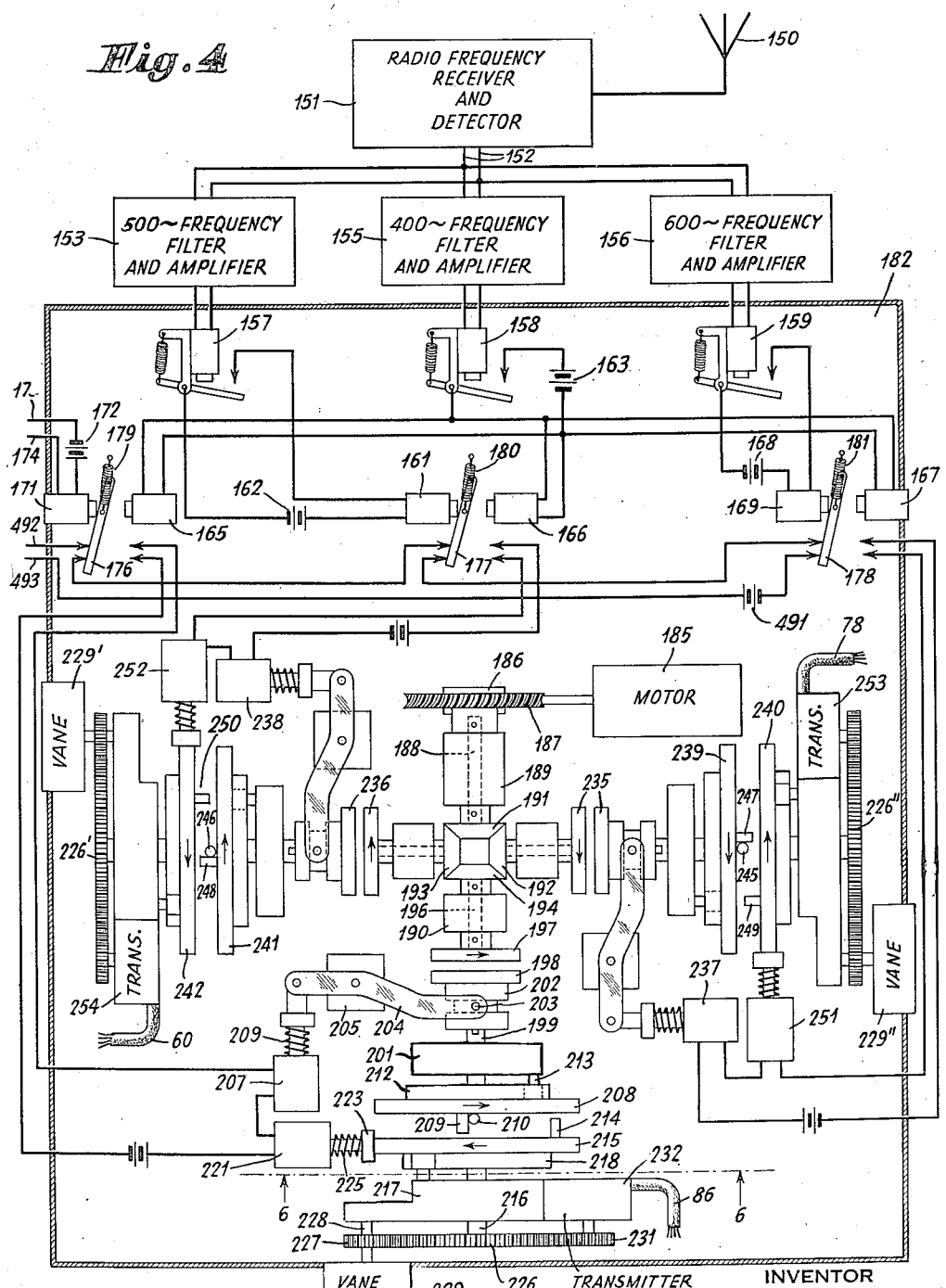
Fig. 4 is a diagrammatic view of the radio receiving means, course angle determining, speed revealing, and distance indicating means used in connection with Figs. 1–3.

Referring more particularly to Fig. 4, a diagrammatic layout is shown of the receiving systems, switch mechanisms and timing devices used in conjunction with apparatus depicted in Figs. 1 to 3.

At 150 is designated a receiving antenna which is connected to the input circuit of a radio receiver and detector 151 which may be of any well known and standard construction and which therefore need not be more fully described herein. The receiver 151 is connected by branch conductors 152 to three filters and amplifiers, 153, 155 and 156 which are tuned to 500 cycles, 400 cycles, and 600 cycles respectively. The output circuits of these amplifiers are connected to three relays 157, 158 and 159. The contact circuit of the relay 157 includes a relay 161 and a battery 162. The contact circuit of the relay 158 includes a battery 163 and three relays 165, 166, and 167. The contact circuit of the relay 159 includes a battery 168 and a relay 169. A relay 171 is located adjacent the relay 165 and its winding is connected to a circuit including a battery 172 and two conductors 173 and 174 which are connected to the contacts of a push button 175 which is located in the cover plate 12. (Fig. 3.)

Between the relays 171 and 165 is pivoted an armature 176, between the relays 161 and 166 is pivoted an armature 177 and between the relays 169 and 167 is pivoted an armature 178. Three springs 179, 180 and 181 are connected to the armatures 176, 177 and 178 and tend to hold these armatures in either the right or left-hand positions, as in a snap switch.

Mounted on a base 182 is a motor 185 driven at a predetermined very constant speed by any suitable source of power not shown. To the shaft of this motor is attached a worm 186 which meshes with a worm wheel 187. This gear is secured to one end of a shaft 188 which is supported in a bearing 189 attached to the base 182. To the other end of the shaft 188 is secured a beveled pinion 191 which meshes with two other beveled pinions 192 and 193 which in turn mesh with a fourth beveled pinion 194.

The beveled pinion 194 is attached to one end of a shaft 196, to the other end of which is secured a clutch member 197. The shaft 196 has a bearing in a bracket 190 secured to the base 182. Located adjacent to the clutch member 197 is a second clutch member 198 which is slidably but not rotatably secured to a shaft 199, which has a bearing in a bracket 201 fastened to the base 182. The secondary clutch member 198 is provided with a slotted hub 202. Located in the of this hub are two pins 203 which are mounted on a Y-shaped arm 204 rotatably mounted on block 205 secured to the base 182. Pivoted to the other end of the arm 204 is the core of a solenoid 207, between which and the solenoid 207 a coil spring 209, which tends to keep the secondary clutch member 198 out of engagement with the primary clutch member 197.

Figure 6:
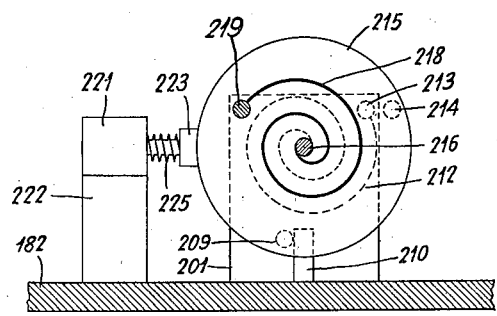
Fig. 6 is a sectional elevation taken on line 6—6 of Fig. 4.

Secured to the end of the shaft 199 is a circular plate 208 which is provided with a pin 209 which normally engages a stop 210 secured to the base 182 (see Fig. 6). Between the bracket 201 and the plate 208 is mounted a spiral spring 212 (see Fig. 6), one end of which is secured to a pin 213 fastened to the bracket 201. The other end of the spiral spring 212 is secured to the shaft 199.

Located adjacent to and in line with the primary plate 208 is a secondary plate 215 which is secured to a shaft 216 which is mounted for rotation in a bracket 217. Secured to the plate 215 is a pin 214. Located between the plate 215 and the bracket 217 is a spiral spring 218 one end of which is attached to a pin 219, which is secured to the bracket 217. The other end of the spiral spring 218 is secured to the shaft 216. Located adjacent to the plate 215 is a solenoid 221 which is supported on a bracket 222 secured to the base 182. Secured to the core of the solenoid 221 is a brake member 223, which normally engages the periphery of the plate 215. Between the brake shoe 223 and the solenoid 221 is located a spiral spring 225 for holding the brake shoe against the plate 215. Secured to the end of the shaft 216 is a gear 226 which engages a pinion 227 secured to a shaft 228 which is mounted for rotation in the bracket 217. To the end of the shaft 228 is fastened a vane 229. Meshing with the gear 226 is a second pinion 231 which is mounted on the shaft of an electrical angular transmitter 232. This transmitter is connected to the other end of the cable 86 depicted in Fig. 3 and Fig. 5.

The pinions 192 and 193 drive identical mechanisms to the one just described, except that they rotate in the opposite directions. Two clutches 235 and 236 correspond to the clutch 197—198 and are operated by solenoids 237 and 238 respectively. Two pairs of plates 239—240 and 241—242 correspond to the plates 208 and 215. Two pins 245 246 correspond to the pin 210. Two pins 247 and 248 are mounted in the plates 239 and 241 respectively and correspond to the pin 209. Two pins 249 and 250 are mounted on the plates 240 and 242 respectively and correspond to the pin 214. Two brake solenoids 251 and 252 correspond to the solenoid 221. Two electrical angular transmitters 253 and 254 correspond to the transmitter 232. The transmitter 253 is connected to the other end of the four wire cable 78 (see Fig. 3) and the transmitter 254 is connected to the other end of the four wire cable 60 (see Fig. 3).

A battery 260 is provided for supplying power necessary to operate the various angle transmitting systems and is connected in circuit with one of the wires in each of the four wire cables 29, 60, 77, 78, 86 and 139.

The electrical transmitters and receivers referred to in this description may be of any well known type, such for example as those shown in Figs. 18 to 21 of my Patent No. 1,431,140 issued October 3, 1922.

Figure 8:
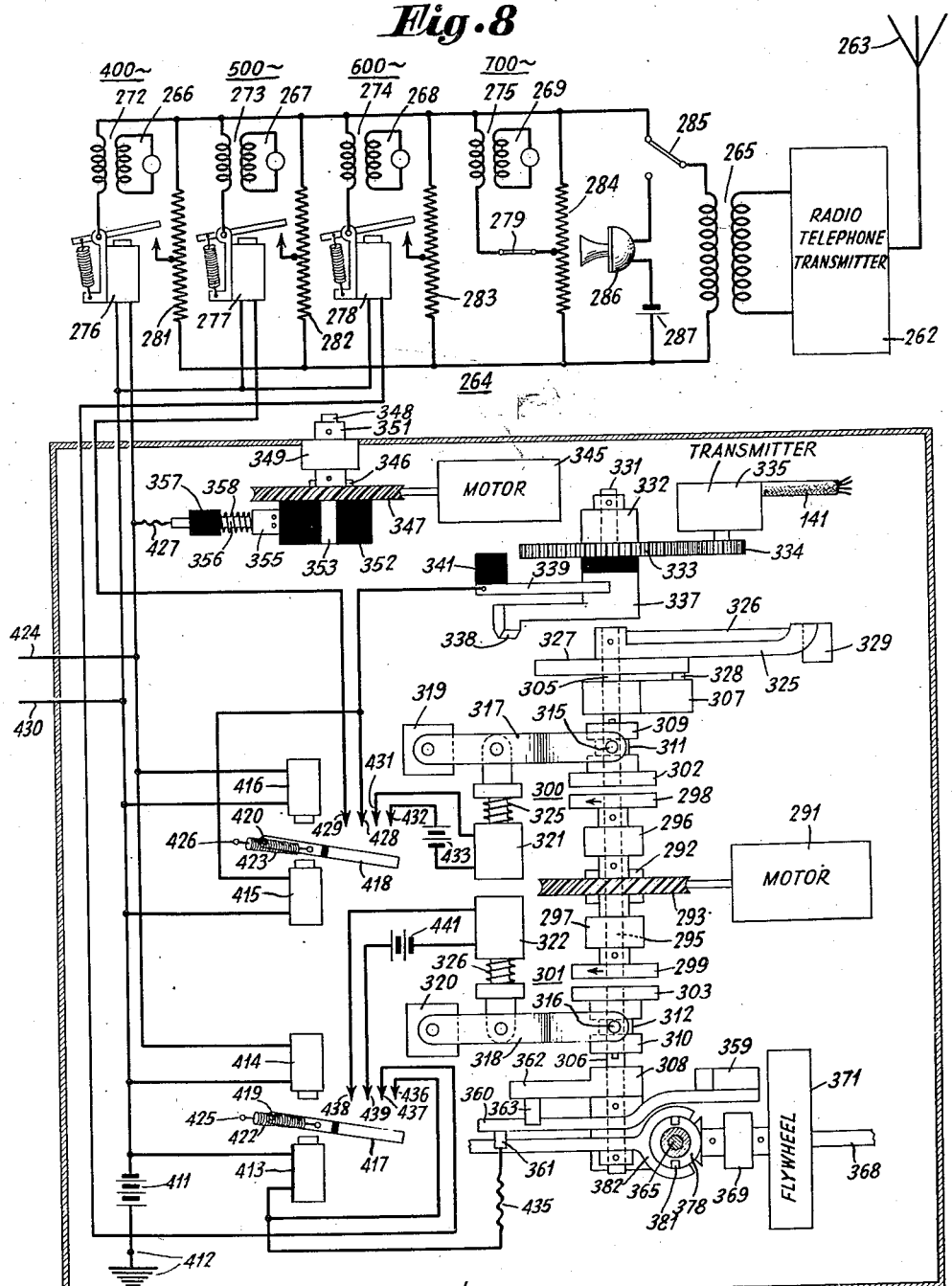
Fig. 8 is a diagrammatic view of the radio transmitting means for determining the course angle, speed and distance of the various vessels.

In Fig. 8 is depicted diagrammatically a scheme for transmitting from one vessel to the other the necessary information regarding the direction of one vessel from the other, the course of the vessel with respect to the points of the compass and also to the center line of the other vessel, the speed of the vessel, and the distance between the vessels.

For accomplishing this purpose, a radio transmitter 262 is shown which may be of any well known or standard construction which need not be more fully described herein. This transmitter is connected to any suitable aerial 263. The transmitter 262 is connected to a system of tone producers 264 by means of a transformer 265. The tone producing circuits comprise four tone sources 266, 267, 268 and 269 which may be of any well known and standard construction which need not be more fully described herein. The circuit 266 produces a tone of 400 cycles, the circuit 267 a tone of 500 cycles, the circuit 268 a tone of 600 cycles, and the circuit 269 a tone of 700 cycles. The tone circuits 266 to 268 are inductively coupled through three transformers 272 to 274 to the armatures of three relays 276 to 278. The contacts of these relays are connected to taps on three resistors 281 to 283. The tone circuit 269 is inductively coupled through a transformer 275 to one side of a switch 279, the other side of which is connected to a tap on a resistor 284. One end of each of the resistors 281 to 284 is connected to one end of the primary of the transformer 265. The other ends of these resistors are connected to one pole of a double throw single pole switch 285, the blade of which is connected to the other end of the primary of the transformer 265. The other pole of the switch 285 is connected through a telephone transmitter 286 and a battery 287 to one side of the primary of the transformer 265.

Mounted on a base 290 of conducting material is a motor 291 which is driven at the same constant speed as the motor 185 of Fig. 4 by any suitable source of power. To the shaft of this motor is attached a worm 292 which meshes with a worm wheel 293. Secured to the worm wheel 293 is a shaft 295 shown in dotted lines. This shaft has bearings in brackets 296 and 297 which are secured to the base 290. Secured to the two ends of the shaft 295 are two primary clutch members 298 and 299 of two clutches 300 and 301. These clutches are provided with secondary clutch members 302 and 303 which are slidably but not rotatably mounted upon two shafts 305 and 306 of conducting material. These shafts are rotatably mounted in brackets 307 and 308 also of conducting material which are secured to the base 290. The secondary clutch members 302 and 303 have secured thereto two hubs 309 and 310 which are provided with slots 311 and 312. These slots are engaged by pins 315 and 316 which are mounted in Y-shaped arms 317 and 318. These arms 317 and 318 are pivoted to blocks 319 and 320 which are secured to the base 290. Pivotally connected to the two arms 317 and 318 are the cores of two solenoids 321 and 322. Between the cores of these solenoids and the solenoids themselves are mounted two springs 325 and 326 which tend to hold the clutches 300 and 301 in disengagement.

Secured to the end of the shaft 305 is an arm 325 of conducting material on which is mounted a metallic wire 326. A spring 327 which is similar to the spring 218 in Fig. 6 is secured at one end to a pin 328 which is mounted on the bracket 307. The other end of the spring 327 is secured to the shaft 305. The spring 327 is so wound that it normally tends to hold the arm 325 in engagement with a stop 329 which is mounted on the base 290.

A shaft 331 is rotatably mounted in a bracket 332 which is secured to the base 290. Fastened to the shaft 331 is a gear 333 which meshes with a pinion 334 which is mounted on the shaft of an electrical transmitter 335. This transmitter is connected to the end of the four wire cable 141 (see Fig. 3). Secured to, but insulated from the gear 333 is an arm 337 of conducting material, which is provided with a V-shaped contact point 338. Engaging the hub of the arm 337 is a brush 339 which is mounted on a bracket of insulating material 341 secured to the base 290.

Mounted on the base 290 is a motor 345, to the shaft of which is attached a worm 346 which meshes with a worm wheel 347. The worm wheel 347 is attached to a shaft 348 of conducting material which is mounted in a bearing 349 of conducting material secured to the base 290. A collar 351 is secured to the shaft 348 to hold the worm wheel 347 in place. Mounted on the worm wheel 347 is a cylindrical commutator 352 of insulating material in which is inserted a segment 353 of conducting material which is connected to the worm wheel 347. Engaging the commutator 352 is a brush 355 of conducting material which is secured to the end of a shaft 356 also of conducting material. This shaft is slidably mounted in a bracket 357 of insulating material. Between the brush 355 and the bracket 357 is a coil spring 358 tending to keep the brush 355 in engagement with the commutator 352.

Secured to the shaft 306 is an arm 360 (see Fig. 9) to one end of which is attached a weight 359. A pin 361 is secured to, but insulated from, the other end of the arm 360. An extension 362 forms part of the bracket 308. Attached to this extension is a pin 363 which limits the upward motion of the arm 360.

A governor 364 is provided, the driving shaft 365 of which is rotatably mounted in the bracket 308. To the lower end of the shaft 365 is secured a beveled pinion 366 which meshes with a second beveled pinion 367. The beveled pinion 367 is secured to the end of a shaft 368 which is rotatably mounted in a bracket 369. Secured to the shaft 368 is a heavy fly wheel 371. To the other end of the shaft 368 is secured a propeller 369, which is immersed in the water in which the vessel is traveling, the shaft 368 being of sufficient length and flexibility to allow the propeller to trail behind the vessel a considerable distance.

Secured to the upper end of the shaft 365 is a head 371 which is provided with arms 372. To these arms are pivoted two links 373, the other ends of which are pivotally connected to heavy weights 375. To these weights are also pivoted two links 376, the other ends of which are pivoted to two arms 377 mounted on a sleeve 378 which slides on the shaft 365. This sleeve is provided with a groove 379 which is engaged by two pins 381, secured to a Y-shaped arm 382 which is rotatably mounted upon the shaft 306. Secured to the other end of the arm 382 are two curved members 385 and 386, the former made of white material and the latter made of black material.

Secured to a bracket 387 which is mounted on the base 290 are two pins 388 and 389. Rotatably mounted on these pins are grooved pulleys 391 and 392. Located in the grooves of these pulleys is an arc-shaped member 393 which is provided on its outer side with gear teeth 394. These teeth engage the teeth of a pinion 395, which is rotatably mounted on a shaft 396, secured to the bracket 387. Fastened to the pinion 395 is a gear 397 which meshes with a pinion 398 secured to the shaft of an electrical transmitter 399. This transmitter is connected to the end of the four wire cable 77. (See Fig. 3.)

Secured to the member 393 are two cone shaped receptacles 401 and 402 which are similar in construction to the cone shaped receptacles 117 and 118 shown in Fig. 3. The receptacle 401 is provided with a source of illumination and a lense for focusing the light on the members 385 and 386 and the receptacle 402 is provided with a photo-electric cell and lense for focusing the light reflected from the members 385 and 386 to the photo-electric cell. This photo-electric cell is connected by conductors 403 and 404 to a relay, solenoid and reversing switch, which are contained in a box 405 and which are similar in construction to the relay 125, solenoid 126, and the reversing switch 132 shown in Fig. 3. A four wire cable 406 connects the reversing switch in the box 405 to a motor 407 which is similar in construction to the motor 133 shown in Fig. 3. To the shaft of the motor 407 is secured pinion 408 which meshes with the gear 394 on the segment 393.

A battery 411 is provided (see Fig. 8), one side of which is grounded at 412 to the base 290 of conducting material. The other side of the battery 411 is connected to one side of the windings of four relays 413, 414, 415, and 416 and is also connected to one side of the windings of the relays 276, 277, and 278. Between the relays 413 and 414 and between the relays 415 and 416 are mounted two armatures 417 and 418 respectively which are pivoted at 419 and 420. Two springs 422 and 423 are connected from points on the armatures 417 and 418 to two pins 425 and 426 secured to the base 290. The armatures 417 and 418 are made of conducting material but are insulated from the base 290 as shown.

The rod 356 is connected by a flexible conductor 427 to the winding of the relay 276 and also to the windings of the relays 414 and 416 and to the winding of a solenoid 421 by means of a conductor 424. (See Fig. 11.) The other side of the winding of the solenoid 421 is connected by a conductor 430 to the battery 411. The solenoid 421 is operatively connected to a steam valve 434 controlling the whistle of the vessel so that when the solenoid is energized the whistle will be sounded.

The brush 339 (Fig. 8) is connected to a contact 428 and to one side of the winding of the relay 415. A second contact 429 is connected to the winding of the relay 277. Two contacts 431 and 432 are connected through a battery 433 to the solenoid 321.

The pin 361 (Figs. 8 and 9) is connected by a flexible conductor 435 to one side of the relay 413 and also to a contact 436. A contact 437 is connected to the winding of the relay 278. Two contacts 438 and 439 are connected through a battery 441 to the winding of the solenoid 322.

Referring to Fig. 12 there is shown a standard type of direction finder which consists of the usual loop 451 mounted on an axis 452 which has bearings in a frame 453. This frame is secured to any suitable support 455 which is attached to the framework of the vessel.

Secured to the shaft 452 is a commutator 456 of insulating material which is provided with two slip rings 457 and 458 which are connected to the two ends of the wires of the loop 451. The slip rings 457 and 458 are engaged by two brushes 459 and 461 which are connected by two conductors 462 and 463 to a radio receiver 465 which may be of any well known and standard construction and need not be more fully described herein. This receiver is tuned to receive the 700 cycle frequency produced by the oscillator 269 shown in Fig. 8 and transmitted by the antenna 263. The output of the receiver 465 is connected to a pair of head phones or other suitable translating device 466.

Secured to the shaft 452 is a gear 467 which meshes with a pinion 468 fastened to a shaft 469 which has bearings in the frame 453. A suitable handle 471 is secured to the end of the shaft 469. Also meshing with the gear 467 is a pinion 472 carried by the shaft of an electrical transmitter 473 which is connected to the end of the cable 29 shown in Fig. 3.

Referring again to Fig. 7, the primary and secondary vessels 21 and 37 respectively are shown proceeding on their courses 480 and 481, which in this particular case are taken to be due south and an angle designated by the numeral 482 east of south. The line 483 is drawn parallel to the course 481 of the vessel 37 and makes an angle designated by the numeral 485 with the course of the vessel 21 equal to the angle 482. The line 486 depicts the distance between the vessels 21 and 37 and the angle this line makes with the course 480 of the vessel 21 is designated by the numeral 487.

In the invention just described it is assumed that both the vessels 21 and 37 are equipped with identical apparatus as described in connection with Figs. 1 to 12. For simplicity it has been assumed that both vessels are transmitting the 400, 500, 600 and 700 cycles, but in practice it may be found desirable to have one vessel transmit these frequencies, while the other transmits another set of frequencies such as 800, 900, 1000 and 1100 cycles. In this case of course the first vessel will have to have its receivers tuned to these frequencies.

In the operation of the invention just described the tone systems 266 to 269 shown in Fig. 8 are running continuously, producing frequencies of 400, 500, 600 and 700 cycles per second respectively. The switches 279 and 285 are normally closed so that the 700 cycle frequency is continuously transmitted by the antenna 263. This 700 cycle frequency transmitted from the vessel 37 will be received by the loop antenna 451 (see Fig. 12) on the vessel 21. The energy thus received will be amplified by the receiver 465 and will be heard in the head phones 466 by the man operating the loop 451 as a 700 cycle note. He will then manipulate the handle 471 so as to receive a minimum signal in the usual manner of direction finding. In doing so, he will cause the transmitter 473 to rotate the repeater 28 (Fig. 3) so as to turn the gear 25 in synchronism with the gear 467, thereby turning the pointer 26 in synchronism with the loop 451, thus causing the pointer 26 to point in the direction of the vessel 37. The pointer 26 will, therefore, make an angle designated by the numeral 490 (Fig. 1) with the center line (direction of travel) of the vessel 21. This angle will be the same as the angle 487 shown in Fig. 7. It is thus seen that the pointer 26 on the vessel 21 will indicate to the captain the direction in which the vessel 37 lies.

The motor 345 on the vessel 37 (Fig. 8) slowly rotates the commutator 352 so that at predetermined intervals, such for example as five minutes, the contact 353 will engage the brush 355. This will close a circuit from the battery 411 to the plate 290 at the ground 412, thence through the conducting bracket 349, shaft 348, gear 347, contact 353, brush 355, conductor 427 through the winding of the relay 276 to the other side of the battery 411. A circuit will also be closed from the conductor 427 through the windings of the relays 416 and 414 and the solenoid 421 to the battery 411 (Figs. 8 and 11). This will cause energization of the relay 276 which will close the circuit from the tone source 266, thus producing a signal of 400 cycles frequency which will be radiated from the antenna 263 on the vessel 37.

The closing of the circuits through the solenoid 421 and the two relays 416 and 414 will cause the whistle of the vessel 37 to be sounded and the two armatures 418 and 417 to be snapped up into engagement with their contacts.

The armature 418 will close a circuit from the battery 433 through the solenoid 321 and the armature 417 will close a circuit from the battery 441 through the solenoid 322. The energization of the two solenoids 321 and 322 will cause the engagement of the clutches 300 and 301 which in turn will start the arms 325 and 360 slowly rotating at a predetermined speed, which is determined by the speed of the motor 291 on the vessel 37 which is running at the same speed as the motor 185 (Fig. 4) on the vessel 21.

The 400 cycle energy radiated by the antenna 263 on the vessel 37 will be picked up by the antenna 150 on the vessel 21. This energy will be amplified by the radio frequency receiver and detector 151 and will be selected by the 400 cycle filter and amplifier 155 where it will be further amplified and will cause the energization of the relay 158. This will close a circuit from the battery 163 through the windings of the relays 165, 166, and 167, thus energizing these three relays which will cause the armatures 176, 177, and 178 to be snapped to the right. This will cause the energization of the solenoids 207, 221, 238, 252, 237 and 251. The energization of the solenoids 207, 238 and 237 will in turn cause the engagement of the clutches 197—198, 236 and 235. This will start the slow rotation of the plates 208, 241, and 239 in the direction of the arrows on these plates.

Figure 5:
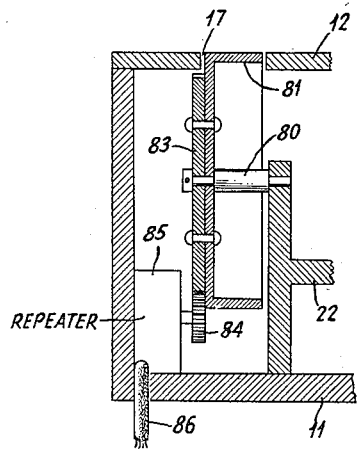
Fig. 5 is a fragmental sectional elevation taken on line 5—5 of Fig. 1.

The energization of the solenoids 221, 252, and 251 will release the brakes from the plates 215, 242 and 240 allowing them to be rotated in the direction of the arrows under the action of the springs attached thereto as shown for example in Fig. 6. The speed of rotation of these plates will be slowed down due to the action of the vanes 229, 229' and 229''. This will cause a slow rotation of the gears 226, 226' and 226'', which in turn will cause the transmitters 232, 254 and 253 to be slowly rotated, this motion being transmitted through the cables 86, 60 and 78 to the repeaters 85, 46 and 76 (Figs. 5 and 3). This will cause the gears 83, 33, and 70 to be slowly rotated, which in turn will cause a slow rotation of the drum 81, ring 35, and drum 66.

This action will continue until the plate 215 (Fig. 4) has rotated a sufficient amount in the direction of the arrow to cause the pin 214 to engage the pin 209 carried by the plate 208 which is rotating in the opposite direction. As soon as this occurs, the pin 209 will drive the plate 215 in the opposite direction at a speed determined by the speed of the motor 185. This, by means of the transmitter 232 and repeater 85, will cause the drum 81 to reverse its motion. Similar actions will take place in regard to the plates 242 and 241 and the plates 240 and 239 so that the ring 35 and drum 66 will also reverse their motions.

Figure 7:
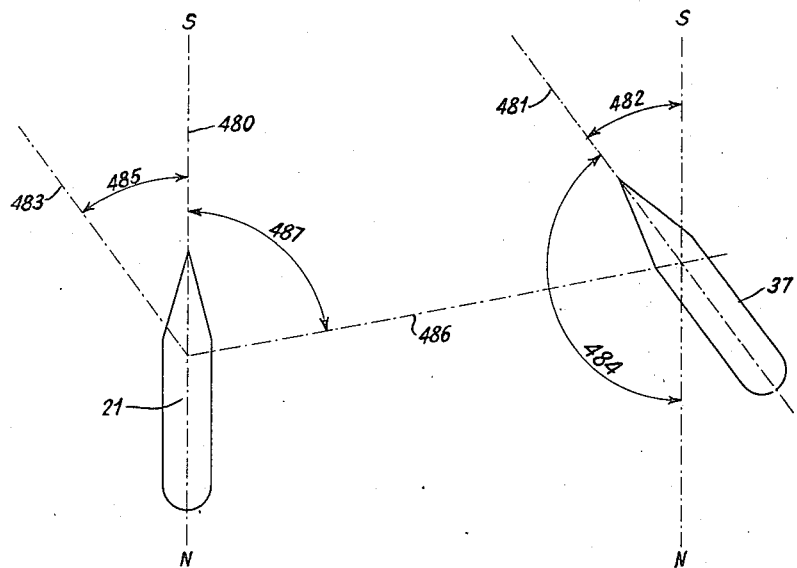
Fig. 7 is a diagrammatic view showing the positions of the two vessels relative to each other.

The position of the arm 337 (Fig. 8) and therefore of the contact 338 is determined by the course of the vessel 37 with respect to the points of the compass. In the present instance the angle that the arm 337 makes with its zero position, which would be in line with the arm 325 when it is resting against the stop 329, is the angle designated by the numeral 484 between north and the course 481 of the vessel 37, as shown in Fig. 7.

As previously stated the arm 325 on vessel 37 started slowly rotating at the instant that the 400 cycle frequency was radiated by the antenna 263. This rotation of the arm continues until the wire 326 engages the contact 338, thus closing a circuit from the battery 411 through the plate 290, bracket 307, arm 325, wire 326, contact 338, brush 339, contact 428, armature 418, contact 429, relay 277 back to the battery 411. This will energize the relay 277 which will cause 500 cycle energy to be transmitted by the antenna 263. At the same time, the circuit will be closed from the brush 339 through the relay 415 to the battery 411. The relay 415, however, is slow acting so that it will allow time for a definite length of 500 cycle impulse to be transmitted by the antenna 263 before the contacts 428 and 429 are opened, thus deenergizing the relay 277 and terminating the 500 cycle impulse. The time interval between the sending of the 400 and 500 cycle impulses is thus seen to be proportional to the position of the arm 337 and therefore to the angle 484 which the course of the vessel 37 makes with north, as shown in Fig. 7.

As soon as the relay 415 is energized, the armature 418 will be snapped into the open position as shown in Fig. 8, thus deenergizing solenoid 321, which will allow the clutch 300 to be disengaged. As soon as this occurs, the spring 327 will cause the arm 325 to be rotated to its initial position against the stop 329 as shown in Fig. 8.

The 500 cycle energy impulse which is radiated by the antenna 263 on the vessel 37 is picked up by the antenna 150 on the vessel 21. This energy is amplified and passes through the filter and amplifier 153 to cause the energization of the relay 157, which in turn energizes the relay 161. This causes the armature 177 to be snapped to the left into the position shown in Fig. 4 which breaks the circuit through the solenoids 238 and 252, the former causing the disengagement of the clutch 236 and the latter applying the brake to the plate 242 which is thereby locked in the position in which it is in at the moment of receiving the 500 cycle impulse. The plate 241 will then be returned to its initial position under the action of the spring so that the pin 248 will be in engagement with the stop 246.

It will thus be noted that the plate 241 on vessel 21 will have rotated at the time of the reception of the 500 cycle impulse an amount which is proportional to the angle through which the arm 325 on vessel 37 rotated from its initial position to the position at which it engaged the contact 338. The plate 242 will be held in a position equal to the angular rotation of the plate 241 and therefore proportional to the motion of the arm 325, which as already described is equal to the angle 484 which the course of the vessel 37 makes with north. It is therefore evident that the position of the plate 242 is equal to the angle 484 and as the plate 242 is connected to the ring 35 by means of the transmitter 254 and repeater 46, it is also evident that the angular displacement of the ring 35 with respect to the compass card 38 will be the angular deviation of the vessel 37 from north, represented in Fig. 1 by the angle 491 which is equal to the angle 484 in Fig. 7.

In order to maintain the compass card 38 pointing north the magnetic compass mechanism 89 is provided. As already described the dial of this magnetic compass is composed of two semicircular segments 90 and 91 of white and black material respectively. Light from the lamp 121 is focused by the lens 119 upon the dial of the compass 89 and when it is reflected from the white sector 90 it will be focused by the lens 120 upon the photo-electric cell 123, thus energizing this cell which in turn will cause the energization of the sensitive relay 125. This will deenergize the solenoid 126 thus allowing the spring 130 to force the core 128 to the right. This will throw the switch 132 to the right which will cause the motor 133 to rotate in a counterclockwise direction, which by means of the pinion 135 will rotate the gear 136 in a clockwise direction.

This by means of the shaft 105 and bracket 116 will move the entire optical system to the left, as seen in Fig. 3 until the beam of light strikes the black sector 91. As no light will be reflected by this black sector the photoelectric cell 123 will be darkened thus deenergizing the relay 125 which will cause the energization of the solenoid 126. This will cause the reversing switch 132 to be moved to the left, thus reversing the motor 133 which in turn will cause the optical system to be moved to the right until the beam of light strikes the white sector 90 when the operation just described will be repeated.

In this way the optical system and, therefore, the gear 136 will follow the movement of the compass dial with a slight hunting motion. The angular movement of the gear 136 will be transmitted by the transmitter 138 and repeater 41 to the compass card 38, so that this card will follow exactly the movements of the dial of the magnetic compass 89.

It can be seen, therefore, in Fig. 1 that the position of the arrow 36 on the ring 35 will give the course of the vessel 37 with respect to north as indicated on the compass card 38 and also with respect to the direction of travel of the vessel 21, as indicated on the dial 18.

The heading of the vessel 21 with respect to the compass is indicated by the position of the lubber line 19 with respect to the compass card 35.

As the vessel 37 moves through the water, the propeller 369 (see Fig. 10) will be rotated in a well known manner. This rotation will be transmitted through the flexible shaft 368 and beveled pinions 367—366 to the governor 364 which will cause the sleeve 378 to assume a position on the shaft 365 which is dependent on the speed of rotation of the shaft 365 in a well known manner. The location of the sleeve 378 will determine the angular position of the arm 382. It is thus seen that the angular position of the arm 382 is determined by the speed of the vessel 37 through the water.

As already described, the arm 360 at the vessel 37 has been slowly rotating in a counter-clockwise direction since the sending of the 400 cycle impulse. After the arm 360 has rotated a sufficient amount, the pin 361 will engage the arm 382, thus closing a circuit from the battery 411 through the plate 290, bracket 308, shaft 306, arm 382, pin 361, conductor 435, contacts 436 and 437, relay 278 and back to the battery 411 and also closing a circuit through the relay 413 and back to the battery 411.

This will energize the relay 278 which will cause 600 cycle energy to be transmitted by the antenna 263. The relay 413 is slow acting so that it will allow time for a definite length of 600 cycle impulse before the armature 417 is snapped into the position shown in Fig. 8, thus opening the contacts 436 and 437 which deenergize the relay 278, thus terminating the 600 cycle impulse.

The contacts 438 and 439 will also be opened, thus deenergizing the solenoid 322 which will allow the clutch 301 to be disengaged. As soon as this occurs, the arm 360 will be rotated to its initial position against the stop 363 as shown in Fig. 9 due to the weight 359 secured to the right-hand end of the arm 360.

The 600 cycle energy impulse which is radiated by the antenna 263 on the vessel 37 is picked up by the antenna 150 on the vessel 21. This energy is amplified and passes through the filter and amplifier 156 to cause the energization of the relay 159 which in turn energizes the relay 169. This causes the armature 178 to be snapped to the left into the position shown in Fig. 4 which breaks the circuit through the solenoids 237 and 251, the former causing the disengagement of the clutch 235 and the latter applying the brake to the plate 240 which is thereby locked in the position in which it is in at the moment of receiving the 600 cycle impulse. The plate 239 will then be returned to its initial position under the action of the spring so that the pin 247 will be in engagement with the stop 245. It will thus be noted that the plate 240 at vessel 21 will have rotated at the time of the reception of the 600 cycle impulse into an angular position which is proportional to the angle through which the arm 360 at vessel 37 is rotated from its initial position. As the position of the arm 382 is determined by the speed at which the vessel 37 is travelling, as already described, it is evident that the angle through which the arm 360 has been rotated and, therefore, the angular position of the plate 240 at the time of the reception of the 600 cycle impulse is proportional to the speed of the vessel 37. The angular position of the plate 240 will be transmitted by the transmitter 253, cable 78, and repeater 76 to the drum 66. It is therefore evident that the position of the drum 66 is proportional to this angle and therefore to the speed of the vessel 37 so that the speed of this vessel 37 may be read directly by the numerals 68 on the drum 66 at vessel 21 as shown in Fig. 1.

The plate 208, Fig. 4, continues to drive the plate 215 at a slow speed in the opposite direction to the arrow shown on this plate as already described. This slow motion is transmitted by the transmitter 232, cable 86, and repeater 85 to the drum 81 which continues to rotate slowly (see Fig. 5). When the captain of the vessel 21 hears the sound of the whistle of the vessel 37 produced at the instant that the 400 cycle radio impulse was sent from the vessel 37, he presses the push button 175, thus closing a circuit from the battery 172, Fig. 4, through conductor 173, push button 175, conductor 174, winding of the relay 171 back to the battery 172. This causes the armature 176 to be snapped to the left, thus breaking the circuit through the solenoids 207 and 221, the former causing the disengagement of the clutch 197—198 and the latter causing the application of the brake 223 which will hold the plate 215 in the position in which it was in at the moment that the captain heard the sound of the other vessel's whistle. The plate 208 will be returned to its initial position with the pin 209 against the stop 210 under the action of the spiral spring 212. The position of the plate 215 is transmitted by the transmitter 232, cable 86, and repeater 85 to the drum 81, so that the numerals 82 engraved on this drum will indicate the distance of the vessel 37 from the vessel 21. The drum 81 has been calibrated by taking into account the speed of travel of the sound of the whistle through the air and the speed of rotation of the plate 208, which is determined by the speed of the driving motor 185.

When the three armatures 176, 177, and 178 are in the left-hand position as shown in Fig. 4, a circuit will be closed from the battery 491 through two conductors 492 and 493 to a lamp 494, located in the plate 12, thus causing this lamp to light which illuminates the face of the instrument shown in Fig. 1. This is done so that the captain of the ship will know that the various dials and pointers are in their proper positions to be read, as otherwise during intervals when the mechanisms are being set, these various dials and pointers might be in such positions as to mislead the captain in regard to the position, distance, etc., of the other ship.

In order to apprise the captain of his own speed, the dial 65 is provided. This is operated continuously from the mechanism shown in Fig. 9. In this figure, the arm 382 takes up an angular position which is proportional to the speed of the vessel as already described. The motion of this arm is closely followed by the motion of the gear sector 393 by means of the photo-electric cell in the casing 402 and the follow-up motor 407 in a manner similar to that described in connection with the photo-electric cell 123 and motor 133 shown in Figs. 2 and 3. The motion of the gear sector 393 is transmitted by means of the pinion 395, gear 397, and pinion 398 to the electrical transmitter 399 which by means of the cable 77 transmits this motion to the repeater 75, see Fig. 3. This repeater turns the drum 65 so that its position is proportional to the position of the gear sector 393 and the arm 382, thus making it proportional to the speed of the vessel. In this way, the captain can read directly by the numerals 67 on the drum 65 the speed of his own vessel.

It is thus seen from the foregoing description that a means is provided for apprising the captain of a vessel of six important facts: namely, (1) the direction of the other vessel from his own ship; (2) the course the other vessel is following with respect to the points of the compass and also with respect to his own direction of travel; (3) the speed at which the other vessel is travelling; (4) the distance of the other vessel from his vessel; (5) the speed of his own ship; and (6) the direction his own ship is travelling with respect to the points of the compass.

Although only a few of the various forms in which this invention may be embodied have been shown herein, it is to be understood that the invention is not limited to any specific construction but might be embodied in various forms without departing from the spirit of the invention or the scope of the appended claims.

I claim:

1. In a navigational guide system, a craft, means on the craft for transmitting signals indicative of the heading of said craft with respect to a predetermined compass point comprising, a transmission system adapted to transmit a plurality of different frequencies, means for periodically transmitting for a short interval of time one of said frequencies, a rotatable element adapted to be rotated from a position of rest against a returning force, the position of rest of said element representing the heading of the craft, a rotatable compass element adapted to be maintained in a position corresponding to a known fixed compass point, said element being mounted in the path of said first named element and arranged so that the two elements contact each other when their directions coincide, means acting to apply a displacing force upon said rotatable element to drive the same at a predetermined speed from its position of rest toward the position of the compass element, means acting upon contact of said elements for causing the transmission of an impulse of energy of a different frequency and for removing the force applied to said rotatable element whereby the rotatable element is returned to its position of rest.

2. In a navigational guide system, a primary vessel and a secondary vessel, means on the secondary vessel for transmitting information to the primary vessel to indicate on the primary vessel the heading of the secondary vessel, said means comprising a transmission system including a plurality of means for generating electrical oscillations of respectively different frequencies, selectively operable means for transmitting oscillations of any one of the generated frequencies, a rotatable element adapted to be rotated from a position of rest against a returning force by the application of a driving force thereto, the position of rest of said element representing the heading of the secondary vessel, a compass controlled rotatable element adapted to be maintained in a position corresponding to a fixed point of the compass irrespective of movements of the secondary vessel, said two elements being mounted for rotation about the same axis whereby the angle between the two elements while the first named element is in its position of rest is the angle of deviation of the heading of said secondary vessel from said fixed compass point, operable means for applying a driving force to said first named element to cause the same to rotate at a predetermined speed, means for rendering said operable means operative to apply said driving force and thereby cause said rotatable element to rotate about its axis at said predetermined speed and at the same time to operate one of said selectively operable means to thereby transmit for a predetermined time interval oscillations of the corresponding one of said frequencies, and means actuated when said rotatable element is rotated an angle which corresponds to said angle of deviation, for operating another one of said selectively operable means to cause the transmission for a short time interval of oscillations of another one of said frequencies and thereafter disconnecting said driving force from said rotatable element, whereby said rotatable element is returned to its position of rest through the action of the returning force.

3. In a system as described in claim 2, a receiving system on the primary vessel including means for separating the various frequencies transmitted by the secondary vessel, a rotatable element adapted to be rotated from a position of rest against a returning force by the application of a driving force thereto, operable means for applying a driving force to the rotatable element on the primary vessel to cause the same to rotate at a speed which bears a predetermined relationship to the speed of rotation of the first named element on the secondary vessel, means acting upon the receipt of oscillations through said receiving system of the frequency of the said first named oscillations transmitted from the secondary vessel for rendering said operable means operative to apply said driving force and thereby cause said rotatable element to be driven about its axis at said predetermined rate, means acting upon the receipt of oscillations through said receiving system of the frequency of the said second named oscillations transmitted from the secondary vessel, for rendering said operable means inoperative to drive said rotatable element whereby said element is returned to its position of rest through the action of the returning force, and means for indicating on the primary vessel the extent of rotation of the rotatable element from its position of rest.

4. In a system as described in claim 2, a receiving system on the primary vessel including means for separating the various frequencies transmitted by the secondary vessel, a rotatable element adapted to be rotated from a position of rest against a returning force by the application of a driving force thereto, operable means for applying a driving force to the rotatable element on the primary vessel to cause the same to rotate at a speed which bears a predetermined relationship to the speed of rotation of the first named element on the secondary vessel, means acting upon the receipt of oscillations through said receiving system of the frequency of the said first named oscillations transmitted from the secondary vessel for rendering said operable means operative to apply said driving force and thereby cause said rotatable element to be driven about its axis at said predetermined rate, means acting upon the receipt of oscillations through said receiving system of the frequency of the said second named oscillations transmitted from the secondary vessel, for rendering said operable means inoperative to drive said rotatable element whereby said element is returned to its position of rest through the action of the returning force, and means for indicating on the primary vessel the extent of rotation of the rotatable element from its position of rest, said last named means including a compass controlled rotatable member adapted to be maintained in a substantially fixed position as respects a predetermined compass point irrespective of movements of said primary vessel, and means including a member rotatably mounted on said compass controlled rotatable member and so that its axis of rotation coincides with the axis of rotation of said compass controlled rotatable member for controlling the rotation of said rotatable member whereby said rotatable member is rotated an amount with respect to said compass controlled rotatable member which represents the heading of the secondary vessel.

5. In a navigational guide system including a primary vessel and a secondary vessel and wherein means are provided on the secondary vessel for transmitting to the primary vessel characteristic signals indicating the angle of deviation of the heading of the secondary vessel with respect to a predetermined known compass point, and means are provided on the primary vessel for receiving the transmitted signals and determining therefrom said angle of deviation, means on the primary vessel for integrating the heading of the secondary vessel with the heading of the primary vessel and directly indicating the angle between said two headings, said last named means including a compass controlled rotatable device adapted to be maintained in a predetermined compass position irrespective of movements of the primary vessel, an indicator rotatably mounted on said compass controlled device and so that its axis of rotation coincides with the axis of rotation of said rotatable device, said indicator being adapted to be rotated by said second named means relative to said compass controlled device so as to indicate the heading of the secondary vessel with respect to the known compass point and indicating means associated with the compass controlled device and said indicator for indicating directly the lubber line of the primary vessel and the angle between the lubber line and the heading of the secondary vessel as indicated by said indicator.

JOHN HAYS HAMMOND, Jr.